Sept. 7, 1937.   R. H. McCARROLL ET AL   2,092,284
APPARATUS FOR MANUFACTURING BEARINGS
Filed Sept. 27, 1935   3 Sheets-Sheet 1

INVENTOR.
R. H. McCarroll
E. C. Jeter
BY
W. Edwin C. McRae.
ATTORNEY.

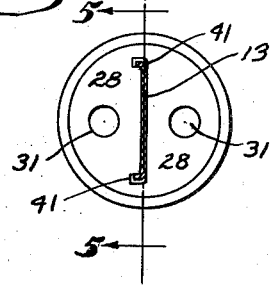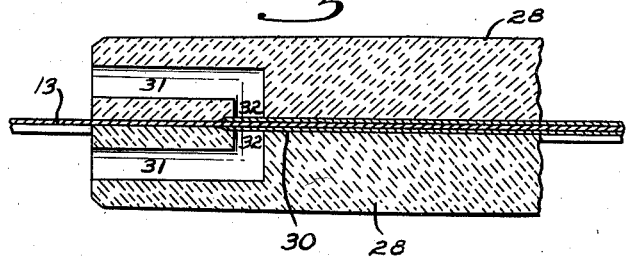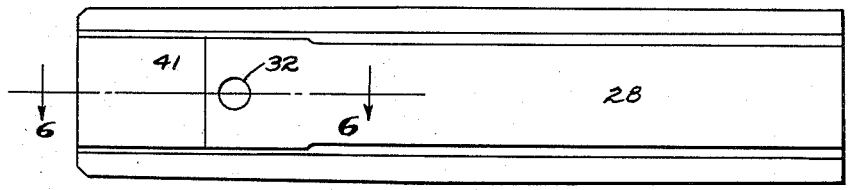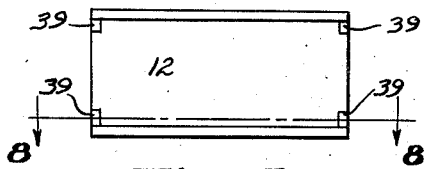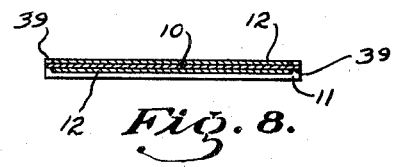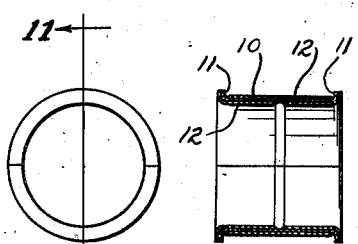

Patented Sept. 7, 1937

2,092,284

UNITED STATES PATENT OFFICE 2,092,284

APPARATUS FOR MANUFACTURING BEARINGS

Russell H. McCarroll, Dearborn, and Edgar C. Jeter, Detroit, Mich., assignors to Ford Motor Company, Dearborn, Mich., a corporation of Delaware Application September 27, 1935, Serial No. 42,450

5 Claims. (Cl. 91—12.5)

The object of our invention is to provide a unique apparatus for manufacturing internal-combustion engine bearings, which apparatus will produce more uniform bearings at a reduced cost. The specific bearing shown herein is a connecting rod bearing for V-type motors, and comprises a pair of half circular shaped steel backing strips having bearing material on both the inner and outer surfaces thereof, the inner surface of the bearing rotating upon the crank shaft throws while the outer surface rotates within the large ends of a pair of connecting rods. The two halves thus "float" between the crank shaft and the connecting rods. Because of the high bearing loads in the modern internal-combustion engine and because in this case the bearing halves are not fixedly secured either to each other or to the crank shaft or the connecting rods, it is necessary to have a steel back to support the bearing material, as no bearing material in itself has been found which is able to withstand the shock and fatigue stresses set up in the motor. In the past it has been customary to provide a brass backing strip and to coat the bearing surfaces thereof with Babbitt metal. Such bearings are suitable for low compression motors; however, present-day motors require that a bearing metal harder than Babbitt be provided, such as a copper-lead mixture and that the bearing metal be supported by steel rather than by brass or bronze. The foregoing has been mentioned to bring out that economy of manufacture is not the paramount reason for substituting steel for brass in the backing strip nor for using copper-lead as the bearing material.

The chief difficulty in providing a copper-lead steel backed bearing is in securing a permanent bond between the bearing metal and the backing strip. Our improved apparatus is believed to accomplish this result more uniformly than is done by any other device known to the applicants. To form such a bearing in the past, it has been customary to shape the steel back to its half circular shape and place same in a die, and then to cast the bearing metal upon both sides thereof so as to form individual castings for each bearing half. This method is not only relatively expensive but considerable variation in the individual castings invariably results. With our improved apparatus, the bearings are continuously formed under identical conditions so that uniform bearings are more readily provided.

Briefly, our machine is designed to coat a low carbon cold rolled steel strip of channel shape. The strip is passed down through a copper-lead bath which is held at 2100 degrees F. The chrome pot which contains the bath is enclosed in a non-oxidizing atmosphere by directing hydrogen gas up and around the pot and the steel strip just where it enters the metal bath. The clean steel strip passes through the bath into a die where the copper and lead mixture brazes onto the steel. The die is formed of graphite, the upper part of which is held at 2100 degrees F. and which forms the bottom of the chrome pot, while the lower end is enclosed in a water jacket. The opening in the die is of a cross section which just allows the steel strip to pass therethrough, while further down through the die the opening is enlarged to the thickness of the strip plus the desired thickness of the coating on each side thereof. Ports are provided in the die which allow the molten copper-lead mixture to flow therethrough to this enlarged portion. As the steel strip which is now surrounded by molten copper-lead passes down through the die, the cold end of the die causes the copper-lead to freeze, thus holding back the hot metal from above. The coated steel, after coming out of the cold end of the die, is now ready for cutting off to length, broaching, and machining into finished bearings.

An analysis of the bearing mixture employed comprises:

| | |
|---|---|
| Lead | 30.00 to 35.00% |
| Copper | 63.00 to 68.00% |
| Iron | .50 Max. |
| Nickel | 1.00 to 1.50% |

It is important that the backing strip should be in the center of the coating or, as stated otherwise, that the thickness of the coating on the finished bearing be the same on both sides of the steel backing strip. To insure this, the steel strip is first cut to lengths slightly longer than the circumferential length of each bearing half. The ends are then nipped; that is, a couple of knife-like blades are driven against the steel strip 3/32" from each end. These knives are set to close just to the thickness of the steel and then the knives are drawn outwardly so as to peel off two spots of the bearing metal from each side and each end of the bearing. The bearing is then set up on a broaching fixture, being located by these spots and the excess stock is broached from each side. It can be seen that by locating by the steel the correct amount or thickness of coating can be maintained. After the broaching operation, the bearing is formed to a perfect half circle in two forming operations and the nipped ends are then broached off and the bearing then given a restrike. The bearing is then ready for finishing which is done in the conventional way, the outside diameter being turned while the inside diameter is either turned or broached.

We have shown in the accompanying drawings a preferred form of machine in which;

Figure 4 is a top view of the graphite forming die employed herein.

Figure 5 is a sectional view, taken on the line 5—5 of Figure 4.

Figure 6 is a sectional view, taken on the line 6—6 of Figure 5.

Figure 7 is a plan view of one of the bearing strips after it has been cut to length and has been "nipped" in order to center same.

Figure 8 is a sectional view, taken on the line 8—8 of Figure 7.

Figure 9 is a sectional view of the strip shown in Figures 7 and 8 after it has been formed to a half circular shape, showing the relative amount of metal which is removed from the ends thereof.

Figure 10 is a half sized end view of the completed bearing which our process is designed to produce, and Figure 11 is a sectional view, taken on the line 11—11 of Figure 10.

Figures 1, 2:
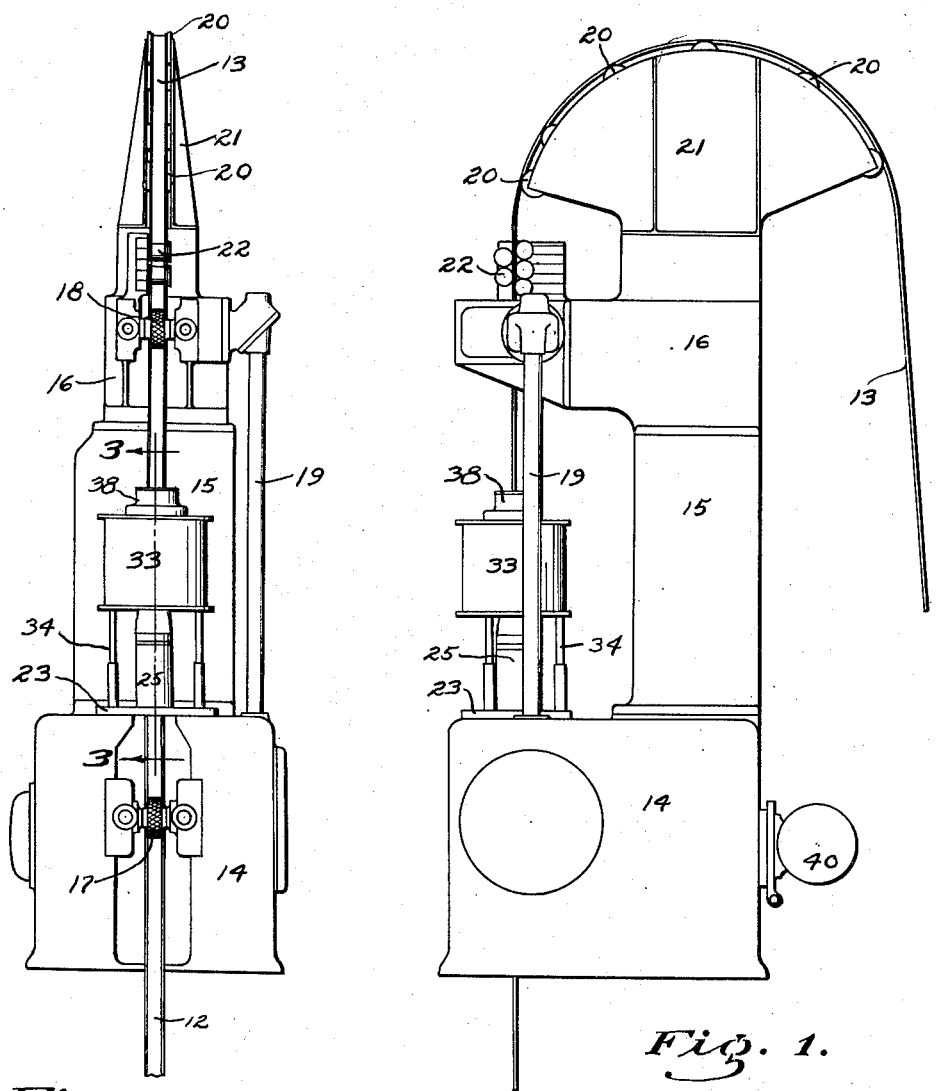
Figure 1 is a side elevation of our preferred machine.
Figure 2 is a front elevation of the machine shown in Figure 1.

Referring to the accompanying drawings, particularly Figures 10 and 11, it will be noted that the complete bearing comprises a pair of half circular steel strips 10 having their circumferential edges flanged upwardly at 11. The strip is about 2 inches wide and from .065 to .070 inch thick. A .020 inch coating of bearing metal 12 is required on both the inside and outside surfaces of the bearing, together with the ends thereof. The total thickness of the bearing is therefore approximately .110 inch; however, a greater thickness of metal must be cast on the bearing in order to finish machine same. The bearing is therefore formed with a coating thickness of approximately $\frac{1}{16}$ of an inch on each side thereof. The excess bearing metal is, of course, removed during the machining operation.

The individual strips 10 are formed as a continuous strip 13, and in order that the strip may be as nearly straight as possible, it is recommended that the strip be rolled in lengths about 100 feet. As each strip 13 is successively fed into the coating machine, it is welded to the preceding strip so that in effect a continuous strip 13 is fed through the coating machine.

The coating machine proper comprises a base member 14 having a vertical column 15 disposed thereon, on the top of which a head 16 is secured. A pair of knurled rollers 17 are rotatably mounted in the base member 14, these rollers being spaced apart slightly less than the thickness of the coated strip. These rollers are geared together to form feeding rollers for the strip. A second pair of knurled rollers 18 are likewise mounted in the head 16 a distance apart slightly less than the thickness of the uncoated strip. The rollers 18 are also geared together and to the rollers 17 by means of a shaft 19. A plurality of guide rollers 20 are rotatably mounted upon a semi-circular support 21 which is disposed above the head 16 so that the strip 13 may be fed up over the rollers 20 and down into the feeding rollers 18 without producing a sharp bend in the strip 13. A plurality of straightening rollers 22 are interposed between the guide rollers 20 and the upper feeding rollers 18, the function of which is to straighten the strip 13 before it enters the feeding rollers 18. Both the rollers 17 and 18 are driven at the same peripheral speeds by means of a motor 40.

Figure 3:
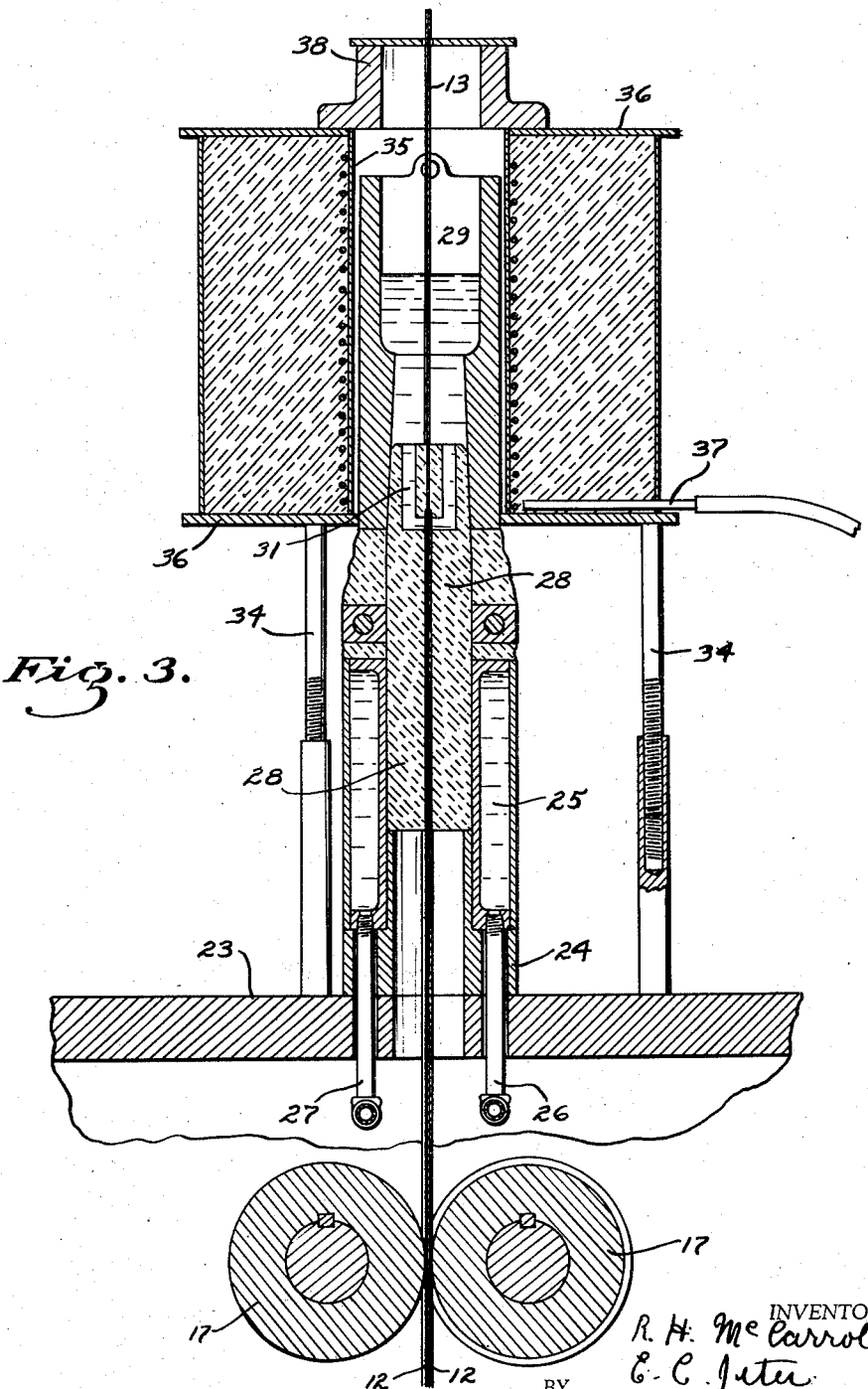
Figure 3 is a sectional view, taken on the line 3—3 of Figure 2, illustrating in detail the more essential features of the device.

The most important part of the apparatus comprises the furnace and die proper, this part of the machine being interposed between the feeding rollers 17 and 18. This apparatus is illustrated in Figure 3 from which it will be seen that a sub-base 23 is secured on the base member 14, in position directly above the rollers 17, the sub-base 23 having a central opening therein over which a collar 24 is secured. A water jacket 25 is superimposed upon the collar 24, this jacket having an annular bore therein which is adapted to receive the lower end of a graphite forming die which will later be described. The water jacket is provided with an annular water passageway therearound and intake and outlet pipes 26 and 27, respectively, connect this jacket with a suitable source of cooling water.

The die proper comprises a graphite cylinder 28 which, for ease in manufacture, is formed as two semi-circular halves. The die is adapted to fit down into the water jacket 25 with its lower end bearing against an extension of the collar 24, while the upper end of the die projects into a chrome pot member 29. The upper portion of the die is tapered at about ¼ of an inch per foot and fits into a similarly tapered opening in the bottom of the pot 29 so that the die may be pressed into the pot member and be fixedly secured therein forming a liquid tight joint. It is not so essential that a tight fit be maintained between the lower end of the die and the jacket 25 so that the jacket is shrunk onto the die member in the conventional manner.

Referring to the upper end of the die, illustrated in Figures 4, 5 and 6, it will be noted that complementary depressions 41 are provided in the adjacent faces of the two die halves to form a passageway which will permit the strip 13 to pass therethrough. Clearance is provided around the outer edges of the strip; however, the strip is accurately centered in the upper end of the die, there being very little clearance at this point between the strip and the bottoms of the depressions 41. About 3 inches from the upper end of the die the depressions 41 increase in depth, as shown at 30, this increase extending the full remaining length of the die. The width of the passageway between the two halves at the point 30 is substantially $\frac{3}{16}$ of an inch. In order to supply liquid metal to the depression at the point 30, a vertical port 31 is provided in each half of the die, which ports extend downwardly adjacent to the point 30. A transverse opening 32 is provided in the flat face of each half which openings extend inwardly so as to coact with the ports 31. Thus, liquid metal may flow through the ports 31 and openings 32 into communication with the enlarged portion of the depressions 41. It is essential that the upper portion of the die quite accurately fit the strip 13 to thus center the strip and produce a uniform coating on each side thereof. It is believed that a wiping action takes place at the upper end of the die which produces an improved bond with the metal which is extruded on the strip at the enlarged portion of the passageway.

A pot 29 is entirely enclosed within a resistance furnace 33, which furnace is supported upon three adjustable legs 34. The furnace comprises cylindrical molybdenum wire wound carborundum muffle 35 which is slightly larger than the chrome pot 29 and which is enclosed within a relatively large steel shell 36. Loose Silocel refractory is interposed between the shell 36 and the muffle 35 in the conventional manner. It will be noted that a tube 37 extends through the shell 36 into position adjacent to the muffle 35 and that at this point openings are provided in the muffle. The tube 37 is connected to a suitable source of hydrogen gas which, when the device is operating, is fed into the furnace to prevent oxidation of the resistance wire, bearing metal, and the strip 13 at the point where it enters the pot 29. The hydrogen gas filters through the muffle 35 and completely surrounds the pot 29. A suitable cover 38 forms a closure for the upper end of the furnace so that, while this cover does not prevent the escape of hydrogen gas still it prevents the admixture of air to the interior of the furnace thereby preventing the oxidation of either the bath or the metal strip.

In operation the furnace is heated to 2100 degrees F. and the strip 13 is fed over the guide rollers 20, down through the straightening rollers 22 and into the upper feeding rollers 18. The straightened strip is then fed through the pot 29, die 28 and through the lower feeding rollers 17. After the strip has been installed in position, the copper-lead bearing mixture of the composition described is poured into the pot 29. The mixture immediately flows down through the ports 31 and openings 32 and into the enlarged portion of the depressions 41. However, the die is sufficiently long that before the metal can flow out through the lower end of the die the cooling jacket 25 freezes same and thus forms a stop at the lower end of the die. The metal strip 13 is at this time being continuously fed through the furnace at the rate of about one foot per minute. The metal in the upper half of the die remains liquid, due to the heat of the pot 29, the solidification occurring in the lower half of the die. The strip 13, being entirely surrounded by hydrogen during its entire course through the high heat zone, is readily brazed to the bearing metal to form an adequate bond therebetween. It is, of course, necessary to occasionally replenish the bearing metal in the pot 29 which, in the machine shown, has a sufficient capacity that replenishing about every fifteen minutes is all that is required.

After the strip 13 has been coated it is cut into the strips 10 and each of these is then placed in a die and the ends are nipped, as shown at 39 in Figures 7 and 8. This is accomplished by pressing in a pair of knife-like blades against the end of the strip on each side thereof, the blades readily penetrating the copper-lead coating but stopping when the steel backing plate is reached. The blades are held in this position while the strip is pushed lengthwise so that the bearing metal is sheared off from the two spots 39 on each side of the strip. The strip 10 is then located in a broaching machine by means of these spots 39. Each side of the bearing is then semi-finished while the strip is still flat. The strip is then placed in a die and in two operations bends to the semi-circular shape, shown in Figure 9, the nipped ends extending above the diameter of the bearing. These ends are then broached off and both the inside and outside diameters are finished to the exact size required. In this manner the steel backing plate is exactly centered so that the same thickness of bearing metal is provided on each side of the bearing.

Among the many advantages arising from the use of our improved machine, it may be well to mention that, a much thinner coating of metal may be applied to the steel backing plate by this machine than is believed possible with the individual casting method formerly employed. No loss of metal results from applying a thicker coating; however, more metal must be removed in the machining operation which results in an increased cost.

Still further, the individually cast method produces in many cases porous bearing metal while with the applicants' machine porosity of the coating is practically unknown.

The commercial advantage of continuously forming the strip is apparent over the individually cast method.

Some changes may be made in the arrangement of our improved apparatus, without departing from the spirit of our invention, and it is our intention to cover by our claims such changes as may reasonably be included within the scope thereof.

We claim as our invention:

1. A device for applying a bearing metal coating to a backing strip comprising, a pot adapted to contain the bearing metal, said pot having an opening therein below the level of said metal, means associated with said pot which maintains the metal therein in a liquid state, a die forming a closure for the opening in said pot, said die projecting outwardly from said pot and having a passageway therethrough, said passageway at a point adjacent to said pot having substantially the same cross section as said strip, and said passageway at a point adjacent to the projecting end of said die having a cross section substantially larger than that of said strip, said die having a port therein connecting the enlarged portion of said passageway with the liquid metal in said pot, cooling means for projecting end of said die, and means for drawing said strip through said pot and the passageway in said die, for the purpose described.

2. A device for applying a metal coating to a backing strip comprising, a pot adapted to contain the coating metal therein in a liquid condition, means for enclosing said pot in a nonoxidizing atmosphere, said pot having an opening therein below the level of said metal, a graphite die forming a closure for said opening, said die projecting outwardly from said pot, and said die having a passageway therein through which said strip is adapted to be drawn, means for cooling the projecting end of said die below the melting temperature of the coating metal, said passageway at a point adjacent to said pot having a cross section substantially equal to the cross section of said backing strip and said passageway at a point adjacent to said cooling means having a cross section substantially larger than the cross section of said backing strip, and said die having ports therein connecting the liquid metal in said pot with the enlarged portion of said passageway, and means for continuously drawing said strip through said pot and die, for the purpose described.

3. A device for applying a bearing metal coating to a steel backing strip comprising, a pot adapted to contain the coating metal, said pot having an opening therein below the level of said metal, a furnace enclosing said pot and maintaining the metal therein in a liquid state, means for conducting nonoxidizing gas into said furnace so as to permeate around said pot, a graphite die forming a closure for the opening in said pot, said die projecting outwardly therefrom, means for cooling the projecting end of said die below the melting temperature of said coating metal, said die having a passageway extending therethrough, the pot end of said passageway having substantially the same cross section as said backing strip while the passageway adjacent to the cooled end of said die has a cross section larger than said backing strip, and said die having ports therein which connect the metal in said pot with said enlarged passageway, and means for continually drawing the backing strip through said pot and die, for the purpose described.

4. A device for applying a bearing metal coating to both sides of a steel backing strip comprising, a pot adapted to contain the bearing metal in a liquid condition, said pot having an opening extending through its bottom surface, a cylindrical graphite die forming a closure for said opening, said die projecting downwardly from said pot, a water cooling jacket enclosing the lower end of said die, said die being split diametrically the length thereof, the diametrical faces thereof each having a depression therein which together form a passageway extending lengthwise through the die, said passageway at a point adjacent to said pot having a cross section equivalent to the cross section of said backing strip, while said passageway adjacent to said cooling jacket has a cross section substantially larger than said backing strip, a port extending downwardly from the upper end of each die half connecting the metal in said pot with the enlarged portion of said passageway, and means for continuously drawing said strip through said pot and the passageway in said die, for the purpose described.

5. A device for applying a bearing metal coating to both sides of a steel backing strip comprising, a pot adapted to contain the bearing metal, a furnace enclosing said pot and maintaining the metal therein in a liquid condition, means associated with said furnace for conducting hydrogen gas to said pot enclosure so as to maintain same in a nonoxidizing atmosphere, said pot having an opening in its bottom surface, a cylindrical graphite die forming a closure for said opening, said die projecting downwardly from said pot and furnace, a water cooling jacket enclosing the lower end of said die, said die being split diametrically the length thereof to form a pair of die halves, the diametrical faces of said halves each having a depression therein which together form a passageway extending the length of the die, said passageway at a point adjacent to said pot having a cross section equivalent to the cross section of said backing strip, while said passageway adjacent to said cooling jacket has a cross section substantially larger than said backing strip, a port extending downwardly from the upper end of each die half connecting the metal in said pot with the enlarged portion of said passageway, and means for continuously drawing said strip through said pot and the passageway in said die.

RUSSELL H. McCARROLL.
EDGAR C. JETER.